UNITED STATES PATENT OFFICE.

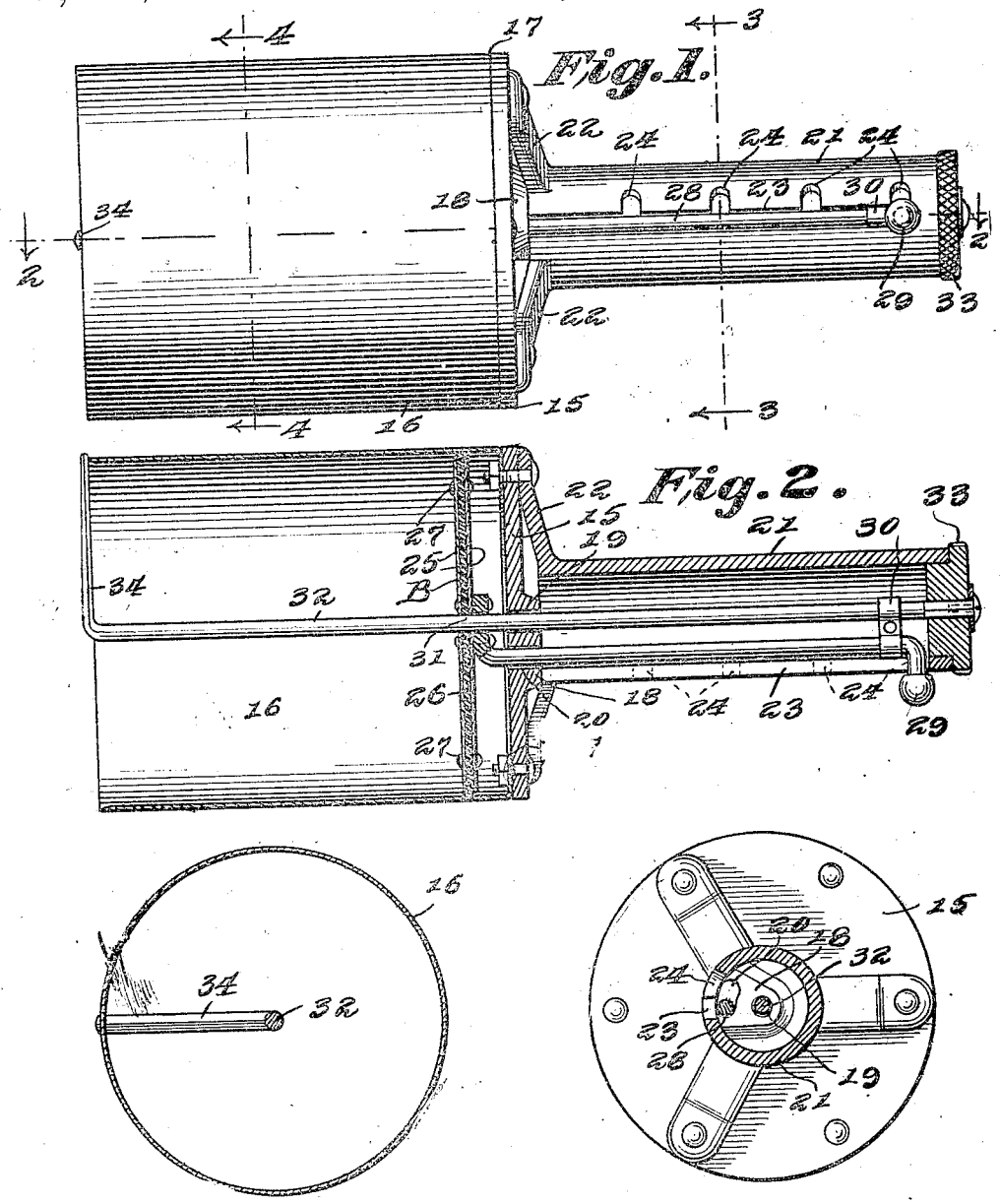

SAMUEL F. MARTIN, OF WAYNESBORO, PENNSYLVANIA.

ICE-CREAM DIPPER.

1,199,590.  Specification of Letters Patent.  Patented Sept. 26, 1916.

Application filed October 26, 1915. Serial No. 57,962.

*To all whom it may concern:*

Be it known that I, SAMUEL F. MARTIN, a citizen of the United States, residing at Waynesboro, in the county of Franklin and State of Pennsylvania, have invented new and useful Improvements in Ice-Cream Dippers, of which the following is a specification.

This invention relates to ice cream dippers or dispensing devices, and it has for its object to produce a simple and effective device of this class by means of which a predetermined quantity of ice cream may be accurately measured and dispensed.

A further object of the invention is to produce a dipper or dispensing device including a measuring scoop and a piston operable therein, said piston being adjustable to vary the capacity of the scoop, and said piston being also capable of being utilized for the purpose of expelling the contents of the scoop.

A further object of the invention is to produce a device of the character described having a rotary cutter adapted to be used for the purpose of separating the ice cream which is to be dispensed from the contents of the vessel in which it is stored, said cutter being also useful for the purpose of loosening the ice cream that is to be dispensed from the piston or plunger.

With these and other ends in view which will readily appear as the nature of the invention is better understood the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a view in side elevation of a device constructed in accordance with the invention. Fig. 2 is a longitudinal sectional view taken on the line 2—2 in Fig. 1. Fig. 3 is a transverse sectional view taken on the line 3—3 in Fig. 1. Fig. 4 is a transverse sectional view taken on the line 4—4 in Fig. 1.

Corresponding parts in the several figures are denoted by like characters of reference.

The improved device comprises a disk or head 15 of circular shape with which a cylindrical measuring scoop 16 is firmly connected, said scoop being preferably made of sheet metal provided at one end thereof with a flange 17, the latter being suitably secured on the disk or head 15. The latter has a thickened or reinforced portion forming a boss 18, the latter having an aperture 19 which is disposed centrally with respect to the disk and an arcuate slot 20 which is concentric with the aperture 19. A tubular handle 21 is provided at one end with legs 22 that are riveted or otherwise secured on the upper face of the disk 15, said handle having a slot 23, one side wall of which is provided at intervals with gage notches 24. Operating in the cylindrical scoop 16 is a piston or plunger B which is preferably formed of two pieces 25 of light sheet metal between which the packing disk 26 of rubber or the like material is secured, the parts being assembled together by rivets 27. The plunger B has a rod or handle 28 firmly secured thereto and extending through the arcuate slot 20 within the tubular handle 21, said rod or handle being terminally bent to form a thumb piece 29 that extends through the slot 23 and is adapted to be engaged with any one of the gage notches 24 by slightly turning the piston about its axis. The handle 28 is provided with a guide loop or eye 30 registering with the central aperture 19 in the disk 15 and also with a central aperture 31 in the plunger. Extending longitudinally through the scoop and guided through the apertures 31, 19 and through the eye 20 is a rod or wire 32 having at one end a disk constituting a handle 33 that abuts on the upper end of the tubular handle 21; the other end of the rod 32 is bent at right angles to the body of the rod to form a radially extending cutter 34 which terminates adjacent to the lower end of the scoop 16.

In the operation of this device the piston or plunger B is adjusted by means of a handle 28 to the desired position within the scoop, the capacity of the latter being thereby varied to receive a predetermined quantity of cream. The piston is retained in position by engaging the thumb piece 29 with one of the gage notches 24. The scoop is now pressed into the body of the cream which will fill that portion of the scoop beyond the piston or plunger B, after which the rod 32 is rotated by the handle 33, causing the cutter 34 to separate the cream within the scoop from the body of the cream outside of the scoop. The scoop containing cream is now withdrawn, and the plunger is manipulated to expel the contents of the scoop. When the plunger reaches the end of the scoop the cutter carrying rod may be again rotated for the purpose of separating the cream from the piston or plunger, thus causing the measured quantity of cream to be discharged in a compact body and leaving the dipper or dispensing device practically clean. The cutting member 34 may be extended slightly beyond the free edge of the scoop to prevent longitudinal movement of the cutter carrying rod, although the operator, by pressing against the handle 33, will accomplish substantially the same result.

Having thus described the invention, what is claimed as new, is:—

1. A device of the class described comprising a cylindrical measuring scoop having a cap provided with a central aperture and with an arcuate slot concentric therewith, a tubular handle secured on the cap and having a longitudinal slot provided with laterally extending notches, a plunger operable in the cylindrical scoop and having a rod extending through the arcuate slot in the cap, said rod having a thumb piece extending through the slot of the handle and adapted to be rotated to engage the gage notches, an axially disposed rod extending through the plunger and through the central aperture in the cap, said rod having a radially extending cutter at one end, said end being at the end of the scoop opposite its cap, and means whereby said rod may be rotated.

2. A device of the class described comprising a cylindrical measuring scoop having a cap provided with a central aperture and with an arcuate slot concentric therewith, a tubular handle secured on the cap and having a longitudinal slot provided with laterally extending notches, a plunger operable in the cylindrical scoop and having a rod extending through the arcuate slot in the cap, said rod having a thumb piece extending through the slot of the handle and adapted to be rotated to engage the gage notches, an axially disposed rod extending through the plunger and through the central aperture in the cap, said rod having a radially extending cutter at one end, said end being at the end of the scoop opposite its cap, and means whereby said rod may be rotated, said means comprising a disk secured on the rod and abutting on the tubular handle.

3. A device of the class described comprising a cylindrical measuring scoop having a cap provided with a central aperture and with an arcuate slot concentric therewith, a tubular handle secured on the cap and having a longitudinal slot provided with laterally extending notches, a plunger operable in the cylindrical scoop and having a rod extending through the arcuate slot in the cap, said rod having a thumb piece extending through the slot of the handle and adapted to be rotated to engage the gage notches, an axially disposed rod extending through the plunger and through the central aperture in the cap, said rod having a radially extending cutter at one end, said end being at the end of the scoop opposite its cap, and means whereby said rod may be rotated, said means comprising a disk secured on the rod and abutting on the tubular handle; the rod constituting the handle of the plunger being provided with an eye through which the centrally disposed cutter carrying rod is guided.

In testimony whereof I affix my signature in presence of two witnesses.

SAMUEL F. MARTIN.

Witnesses:
  L. H. GERTH,
  JNO. C. BOLINGER.